United States Patent [19]

Rivard

[11] Patent Number: 5,155,947
[45] Date of Patent: Oct. 20, 1992

[54] SCENTED FISHING LURE

[76] Inventor: David J. Rivard, 18656 Beatrice, Mt. Clemens, Mich. 48043

[21] Appl. No.: 633,098

[22] Filed: Dec. 21, 1990

[51] Int. Cl.[5] ............................................. A01K 85/00
[52] U.S. Cl. ................................................. 43/42.06
[58] Field of Search ...................... 43/42.06, 41, 44.99

[56] References Cited

U.S. PATENT DOCUMENTS

| | | | |
|---|---|---|---|
| 2,674,058 | 4/1954 | Lindenberg | 43/42.06 |
| 3,105,317 | 10/1963 | Fox | 43/42.06 |
| 3,835,572 | 9/1974 | Mounsey | 43/42.06 |
| 3,971,152 | 7/1976 | Husson, Jr. | 43/42.06 |
| 3,987,575 | 10/1976 | Morita | 43/42.06 |
| 4,257,182 | 3/1981 | Thom | 43/42.06 |
| 4,267,658 | 5/1981 | Brown | 43/42.06 |
| 4,550,521 | 11/1985 | Hayden | 43/41 |
| 4,553,348 | 11/1985 | Cooper | 43/42.06 |
| 4,554,756 | 11/1985 | Thomas | 43/42.06 |
| 4,742,638 | 5/1988 | Vobeida | 43/42.06 |
| 4,888,907 | 12/1989 | Gibbs | 43/42.06 |

FOREIGN PATENT DOCUMENTS 794152  4/1958  United Kingdom ............... 43/42.06

Primary Examiner—Richard K. Seidel
Assistant Examiner—Jeanne M. Elpel
Attorney, Agent, or Firm—Brooks & Kushman

[57] ABSTRACT

A fishing lure designed to controllably release fish attractant as it is being trolled in a body of water, thereby attracting fish. The fishing lure has an internal cavity into which fish attractant is introduced through an entry aperture. When the lure is being trolled, water enters through the entry aperture, flows through the internal cavity and disperses out through an exit aperture flushing out a small amount of fish attractant with it. A baffle located within the internal cavity controls flushing of the fish attractant.

6 Claims, 1 Drawing Sheet

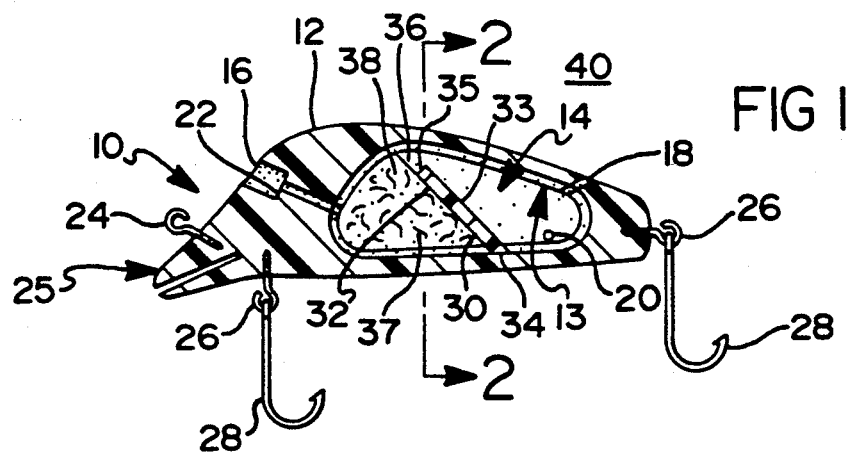
FIG 1
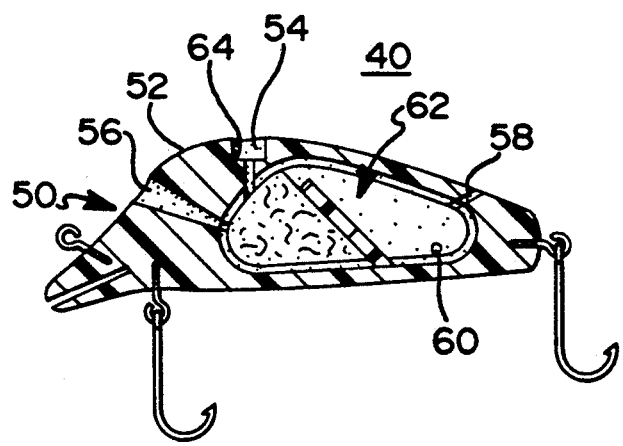
FIG 2
FIG 3

SCENTED FISHING LURE

TECHNICAL FIELD

The present invention is directed to a fishing lure utilizing a liquid, gel, paste or solid fish attractant to attract and catch fish. More particularly, the present invention is directed to a novel and improved fishing lure designed to attract fish by allowing water to flow through the fishing lure thereby flushing fish attractant from an internal cavity located within the fishing lure at a controlled rate and into the body of water through which the lure is being trolled.

BACKGROUND OF THE INVENTION

A wide variety of fishing lures are used to attract and catch fish. Most typically such lures depend upon their visual appearance or movement in the water to attract fish. Some prior lures have also utilized fish attractant which, as it disperses into the water, attracts fish to strike the lure by way of the attractant's scent or color.

Fish attractant may come in liquid, gel, paste or solid form. The liquid, gel or paste attractant is sometimes applied to the exterior of fishing lures. However, that method is disadvantageous because the fish attractant is quickly washed away from the surface of the lure, especially if trolled rapidly or used in swift running water.

Other prior art lures have employed hollow bodies into which fish attractant is introduced, the intention being that the attractant disperses into the water by various means during use of the lure. However, many of these prior art lures have the disadvantage of employing a mechanical means for dispersal, which is not only expensive, but is susceptible to mechanical wear and failure, especially under differing water and temperature conditions. Furthermore, such lures can only be used with liquid fish attractant, limiting the types of scents which can be employed. Examples of such prior art fishing lures are as follows:

Gibbs U.S. Pat. No. 4,888,907 discloses a fishing lure with a hollow cavity in which a liquid fish attractant receiving bladder is positioned. A valve controls discharge of the liquid fish attractant from the bladder as the lure is drawn through the water.

Brown, et al. U.S. Pat. No. 4,267,658 discloses a hollow body fishing lure containing a perforated bellows into which liquid fish attractant is placed. A fishing line is connected to the bellows in such a manner that when pulled, it contracts the bellows causing liquid fish attractant to be expelled from the bellows. A rear duct allows the liquid fish attractant to escape into the water.

Vobejda U.S. Pat. No. 4,742,638 discloses a fishing lure with a hollow body which is normally liquid tight. A closeable opening allows liquid fish attractant to be placed inside the hollow body. A rotatable shaft is mounted inside the hollow body and extends through the rear of the body into the outside water where a propeller is attached. The rotatable shaft is grooved spirally so that as the lure is trolled through the water, the propeller spins and liquid fish attractant is discharged through the groove into the water.

Morita U.S. Pat. No. 3,987,575 discloses a fishing lure having a hollow chamber into which a separate container containing liquid fish attractant can be placed. A spring lever means is employed to retain the container in the fishing lure. Following insertion, the container is punctured allowing the liquid fish attractant to escape into the water through an opening as the fishing lure is trolled.

Other prior art lures allow water to flow through a hollow lure body by way of openings between the exterior and interior of the lure. As the lure is pulled, water flowing through the lure carries with it fish attractant that has been introduced into the hollow body. However, these types of lures suffer disadvantages. First, none utilize a simple non-mechanical means to impede the discharge of fish attractant through the exit openings. As a result the fish attractant is rapidly used up, often requiring the fishing lure to be refilled prior to every cast. Second, some earlier embodiments employ a mechanical means to prevent premature loss of the bait from the internal cavity into the atmosphere prior to use. Such mechanical means are again susceptible to mechanical wear and failure. Examples of such fishing lures are as follows:

Mounsey U.S. Pat. No. 3,835,572 discloses a hollow body fishing lure with a forward end opening through which fish attractant can be placed inside the lure. When the lure is trolled the forward end opening allows water to flow into the lure and out through a number of escape openings located in the medial peripheral portion of the fishing lure, carrying with it the fish attractant. A check-valve means mounted in the chamber prevents premature loss of the fish attractant prior to trolling.

Hayden U.S. Pat. Nos. 4,550,521 discloses a fishing lure with a hollow cavity in the upper half of the body. An opening in the upper front portion of the body allows bait to be placed inside the hollow cavity. A number of small openings in the upper rear portion of the body allow string-like pieces of bait to disperse through the small openings when the lure is trolled.

The present invention provides an inexpensive method of controlling the discharge of fish attractant from the fishing lure while trolling, and a method of preventing the premature loss of fish attractant prior to trolling, without employing a mechanical means. The present invention can be used a number of times before refilling. Furthermore, it allows for the use of liquid, gel, paste or solid fish attractant.

DISCLOSURE OF INVENTION

This invention contemplates a fishing lure having a non-mechanical means for controlling the discharge of fish attractant while being trolled. The term trolling can include pulling the lure through the water at a constant speed, at varying speeds or in jerky or spasmodic movements, depending on the action desired by the fisherman.

The fishing lure includes a lure body having a body front end, an an interior surface defining internal cavity into which liquid, gel, paste or solid fish attractant is received and a baffle plate located within the internal cavity to impede flushing of fish attractant from the internal cavity while the lure is being trolled. The baffle plate has a plate front, a plate rear, and plate edges. The plate edges are connected to the interior surface except for a plate free edge spaced from the interior surface and forming an opening between the plate free edge and the interior surface. The baffle plate is angled forward toward the body front end forming a bait pocket. The lure body includes an entry aperture in fluid communication between the open water in which the lure is trolled and the internal cavity. The lure body also includes an exit aperture in fluid communication between the open water in which the lure is trolled and the internal cavity. Fish attractant can be inserted into the internal cavity through one of the following, depending upon the particular embodiment utilized; the entry aperture, exit aperture or a separate loading aperture. While trolling the lure in an open body of water, water flows into the internal cavity through the entry aperture and out through the exit aperture flushing with it a small amount of fish attractant, the remainder of the fish attractant being retained in the internal cavity in the bait pocket formed by the baffle plate.

Accordingly, it is a general object of the invention to provide a fishing lure with an internal cavity which is equipped with means to retain the fish attractant during handling and casting of the lure and to control its release while trolling the lure in a body of water.

In accordance with another aspect of this invention, an absorbent material is located within the internal cavity. The absorbent material receives liquid fish attractant introduced into the internal cavity. While trolling the lure in an open body of water, water flowing through the internal cavity carries out with it a portion of the fish attractant while the remainder is retained in the absorbent material.

In accordance with yet another aspect of this invention, one of the following apertures, the entry aperture, exit aperture, or a separate loading aperture, has a configuration designed to mate with a fish attractant dispenser to facilitate the leak-free transfer of fish attractant into the internal cavity.

Further objects and advantages of this invention will be apparent from the following description, reference being had to the accompanying drawings wherein preferred embodiments of the present invention are clearly shown.

BRIEF DESCRIPTION OF DRAWINGS

FIG. 1 is a diagrammatic side elevational view of one embodiment of the invention, partly broken away to show an internal cavity and apertures thereto;

FIG. 2 is a cross-sectional view taken along line 2-2 of FIG. 1; and

FIG. 3 is a diagrammatic view similar to FIG. 1 of an alternative embodiment of the invention.

BEST MODES FOR CARRYING OF THE INVENTION

Referring to FIGS. 1 and 2, the fishing lure 10 includes a lure body 12 constructed in accordance with a preferred embodiment from an appropriate material such as plastic. The lure body can be of any desired design, color or external shape. The particular design, color or shape is not part of the invention.

The lure body 12 has a body front end 25 and an interior surface 13 defining an internal cavity 14 which is in fluid communication with the exterior environment 40 by way of at least one entry aperture 16 and at least one exit aperture, such as 18 and/or 20. The exterior environment 40 may be a body of water through which the lure is intended to be trolled.

Liquid, gel, paste or solid fish attractant is introduced into the internal cavity 14 through the entry aperture 16. Solid fish attractant may be in a powder or granulated state to facilitate introduction. In one embodiment, the entry aperture 16 is shaped in such a manner as to mate with an attractant dispenser to facilitate introduction of fish attractant into the internal cavity 14. For example, in the embodiment shown, a lip 22 is located within the entry aperture 16 against which the shoulder of an attractant dispenser can be placed while attractant is forced under pressure into the internal cavity 14.

Alternatively, the exit aperture 18 and/or 20 may be shaped in such a manner as to mate with an attractant dispenser to facilitate introduction of fish attractant into the internal cavity 14.

A fishing line eyelet 24 is secured to the lure body 12 to which a fishing line can be attached. One or more hook eyelets 26, to which fishing hooks 28 can be attached, may be secured to the lure body 12 as desired.

One or more baffle plates 30 are located within the internal cavity. In the embodiment illustrated in FIGS. 1 and 2, the baffle plate 30 has a plate front 32, a plate rear 33 and plate edges 34. The plate edges 34 are connected to the interior surface 13 excepting a plate free edge 35 spaced from the interior surface 13 and forming an opening 36 between the plate free edge 35 and the interior surface 13. The baffle plate 30 is angled forward toward the body front end 25 to form a bait pocket 37. As fish attractant is introduced through the entry aperture 16 into the internal cavity 14 it is prevented from prematurely running out the exit aperture 18 and/or 20 by the bait pocket 37 formed by the baffle plate 30. After the introduction of fish attractant into the internal cavity 14, the bait pocket 37 formed by baffle plate 30 also helps prevent fish attractant from being prematurely lost or ejected out the exit aperture 18 and/or 20 during handling or casting of the fishing lure 10.

The entry aperture 16 is oriented to allow water in the exterior environment 40 to flow into the internal cavity 14 while the lure is being trolled. The exit aperture 18 and/or 20 is oriented to allow the flushing of a portion of the fish attractant out of the internal cavity 14 while the lure is being trolled, the flushing action being carried out by the water which flowed into the internal cavity 14 through the entry aperture 16. As long as there is fish attractant within the internal cavity 14, any trolling of the fishing lure 10 through water will cause small amounts of fish attractant to be dispersed into the water, attracting fish to approach and strike the fishing lure 10. The baffle plate 30 prevents the fish attractant from being quickly flushed from the internal cavity 14, thereby allowing the fishing lure 10 to be used a number of times before refilling with fish attractant. The rate of flush depends on the opening 36 between plate free edge 35 and the internal cavity 14, the number of baffle plates 30 and the physical nature of the fish attractant.

In a variation of the embodiment illustrated in FIGS. 1 and 2, absorbent material 38 may also be located within the internal cavity 14 and, if desired, may be secured to the interior surface 13. The absorbent material 38 may be made from any material designed to absorb and retain liquid and cooperates with baffle 30 in such retention. When liquid fish attractant is introduced through the entry aperture 16 into the internal cavity 14 it will then be absorbed by the absorbent material 38. When the fishing lure 10 is being trolled by pulling on, or reeling in, a fishing line attached to the eyelet 24, water flowing through the internal cavity 14 and dispersing out the exit aperture 18 and/or 20 will carry with it small amounts of liquid fish attractant, the remainder being retained in the absorbent material 38 or by the baffle plate 30. The absorbent material 38 in combination with bait pocket 37 formed by the baffle plate 30 also prevents fish attractant from being prematurely lost or ejected from the fishing lure 10 during handling or casting prior to trolling.

In an alternative embodiment, as illustrated in FIG. 3, the fishing lure 50 includes a lure body 52 having a loading aperture 54, in addition to an entry aperture 56 and an exit aperture 58 and/or 60 in fluid communication with an internal cavity 62. The loading aperture 54 is shaped in such as manner as to mate with an attractant dispenser to facilitate introduction of fish attractant into the internal cavity 62. In the embodiment shown, a lip 64 is located within the loading aperture 54 against which the shoulder of an attractant dispenser can be placed while attractant is forced under pressure into the internal cavity 62. In this embodiment, the entry aperture 56 is not shaped to mate with an attractant dispenser but is oriented to allow water in the exterior environment 40 to flow into the internal cavity 62 and mix with the fish attractant while the fishing lure 50 is being trolled.

While the embodiments of the present invention as herein disclosed constitute preferred forms, it is to be understood that other forms might be adopted within the scope of the appended claims.

What is claimed is:

1. A fishing lure adapted to release fish attractant as it is trolled in a body of water, the fishing lure comprising:

a lure body having a body front end and an interior surface defining an internal cavity adapted to receive fish attractant and an entry aperture for communicating the internal cavity with the body of water and oriented to allow water to flow into the internal cavity and mix with the fish attractant while the fishing lure is being trolled in the body of water;

the lure body also having an exit aperture for communicating the internal cavity with the body of water and oriented to allow the water which flowed into the internal cavity to flush fish attractant out of the internal cavity while the lure is being trolled in the body of water; and a baffle plate having a plate front and a plate rear as well as plate edges, the plate edges being connected to the interior surface except for a plate free edge spaced from the interior surface and forming an opening between the plate free edge and the interior surface and the baffle plate being angled forward towards the body front end forming a bait pocket within the internal cavity.

2. The fishing lure as defined in claim 1 further comprising an absorbent material within the internal cavity to further control the flushing of fish attractant out of the internal cavity while the fishing lure is being trolled in the body of water.

3. The fishing lure as defined in claim 2 wherein the absorbent material is secured to the interior surface.

4. The fishing lure as defined in one of claims 1, 2 or 3 wherein the entry aperture is configured to mate with an attractant dispenser to facilitate the receipt of fish attractant through the entry aperture into the internal cavity.

5. The fishing lure as defined in one of claims 1, 2 or 3 wherein the exit aperture is configured to mate with an attractant dispenser to facilitate the receipt of fish attractant through the exit aperture into the internal cavity.

6. The fishing lure as defined in one of claims 1, 2 or 3 further including a loading aperture for communicating the internal cavity with the body of water and configured to mate with an attractant dispenser to facilitate the receipt of fish attractant through the loading aperture into the internal cavity.

* * * * *

UNITED STATES PATENT AND TRADEMARK OFFICE
CERTIFICATE OF CORRECTION

PATENT NO. : 5,155,947
DATED : October 20, 1992
INVENTOR(S) : David J. Rivard

It is certified that error appears in the above-indentified patent and that said Letters Patent is hereby corrected as shown below:

Title Page, delete inventor's address "18656 Beatrice, Mt. Clemens, MI 48043" and insert --37149 Kelly Rd., Mt. Clemens, MI 48043-- in its place (per amendment 5/20/92).

Column 2, Line 54 (Appln. Page 5, Line 9, per amendment 5/20/92), after "end," delete the first --an--. After "defining" insert "an".

Column 4, Lines 47-48 (Appln. Page 8, Line 27, per amendment 5/20/92), after "between" insert "the".

Signed and Sealed this

Twelfth Day of October, 1993

Attest:

BRUCE LEHMAN

*Attesting Officer*      *Commissioner of Patents and Trademarks*